United States Patent
Fox et al.

(10) Patent No.: US 7,681,233 B1
(45) Date of Patent: Mar. 16, 2010

(54) METHOD AND APPARATUS FOR CONTROLLING EVALUATION OF PROTECTED INTELLECTUAL PROPERTY IN HARDWARE

(75) Inventors: Jeffrey R. Fox, Los Gatos, CA (US); Brad Kadet, Tokyo (JP); Roger Bryner, Salt Lake City, UT (US); Craig Lytle, Los Altos Hills, CA (US)

(73) Assignee: Altera Corporation, San Jose, CA (US)

( * ) Notice: Subject to any disclaimer, the term of this patent is extended or adjusted under 35 U.S.C. 154(b) by 459 days.

(21) Appl. No.: 11/757,262

(22) Filed: Jun. 1, 2007
(Under 37 CFR 1.47)

Related U.S. Application Data (63) Continuation of application No. 10/339,170, filed on Jan. 7, 2003, now Pat. No. 7,234,159.

(51) Int. Cl.
*G06F 12/14* (2006.01)
*G06F 7/04* (2006.01)
(52) U.S. Cl. .............................. 726/9; 726/20; 713/190
(58) Field of Classification Search .................. 713/190
See application file for complete search history.

(56) References Cited

U.S. PATENT DOCUMENTS

| | | | |
|---|---|---|---|
| 5,454,114 A | 9/1995 | Yach et al. | |
| 5,675,622 A | 10/1997 | Hewitt et al. | |
| 5,686,904 A | 11/1997 | Bruwer | |
| 5,841,866 A | 11/1998 | Bruwer et al. | |
| 6,049,289 A | 4/2000 | Waggamon et al. | |
| 6,107,821 A | 8/2000 | Kelem et al. | |
| 6,108,326 A | 8/2000 | Bruwer | |
| 6,157,695 A | 12/2000 | Barna | |
| 6,166,650 A | 12/2000 | Bruwer | |
| 6,166,960 A | 12/2000 | Marneweck et al. | |
| 6,175,312 B1 | 1/2001 | Bruwer et al. | |
| 6,191,701 B1 | 2/2001 | Bruwer | |
| 6,308,270 B1 | 10/2001 | Guthery | |
| 6,340,897 B1 | 1/2002 | Lytle et al. | |
| 6,356,161 B1 | 3/2002 | Nolan et al. | |
| 6,393,589 B1 | 5/2002 | Smit et al. | |
| 6,528,901 B1 * | 3/2003 | Canter ......................... | 307/11 |
| 6,826,717 B1 | 11/2004 | Draper et al. | |
| 6,981,153 B1 * | 12/2005 | Pang et al. .................. | 713/194 |
| 2002/0069354 A1 | 6/2002 | Fallon et al. | |
| 2004/0083414 A1 * | 4/2004 | Parker et al. ................. | 714/737 |

\* cited by examiner

*Primary Examiner*—Matthew B Smithers
(74) *Attorney, Agent, or Firm*—Weaver Austin Villeneuve & Sampson LLP (57) ABSTRACT

Various techniques permit more thorough development of digital systems and devices by designers while protecting the proprietary interests of the owners of the intellectual property incorporated in such systems and devices. More specifically, systems, apparatus, methods and computer program products control use of hardware and software and IP implemented as user logic in a programmed device. The programmed device includes programmed logic that has designed logic and control logic. The designed logic includes user logic and protected logic such as IP cores, the use of which is to be controlled. The control logic includes a signal generator external to the designed logic. This signal generator contains clock means and a timeout circuit. A controller is connected to the programmed device by a tether. The controller periodically sends a keep alive signal via the tether to the signal generator. These keep alive signals may be single bit or multi-bit tokens which are processed in the programmed device by the signal generator. The signal generator disables the programmed device when the signal generator reaches a programmed time limit before receiving a keep alive signal from the controller. Disabling the programmed device can be accomplished by disabling either the user logic or the protected logic or both.

21 Claims, 7 Drawing Sheets

METHOD AND APPARATUS FOR CONTROLLING EVALUATION OF PROTECTED INTELLECTUAL PROPERTY IN HARDWARE

CROSS-REFERENCE TO RELATED APPLICATIONS

The present invention is a continuation of co-pending U.S. patent application Ser. No. 10/339,170, filed Jan. 7, 2003, which is incorporated herein by reference in its entirety.

BACKGROUND OF THE INVENTION

1. Field of the Invention

This invention relates generally to methods, machine readable media and apparatus for protecting intellectual property ("IP"). More specifically, this invention relates to a technique for providing controlled use of IP.

2. Description of Related Art

Electronic design automation ("EDA") is becoming increasingly complicated and time consuming, due in part to the increasing size and complexity of the devices designed by EDA tools. The design of even the simplest of these devices typically involves generation of a high level architecture and RTL design, logic simulation, logic synthesis, timing simulation, etc. Such devices, referred to as a "logic devices" herein, include general purpose microprocessors and custom logic devices such as programmable logic devices, application specific integrated circuit (ASIC) emulators, application specific standard product (ASSP) emulators and/or ASSP devices that possess special or optional features that can be accessed by an authorized user.

A programmable logic device ("PLD") is a programmable integrated circuit that allows the user of the circuit, using software control, to program the PLD to perform particular logic functions. A wide variety of these devices are manufactured by Altera Corporation of San Jose, Calif. When an integrated circuit manufacturer supplies a typical programmable logic device, it is not yet capable of performing any specific function. The user, in conjunction with software supplied by the manufacturer or created by the user or an affiliated source, can program the PLD to perform a particular function or functions required by the user's application. One or more of these programmed functions can be found in what is referred to commonly as a "core" within a PLD. These cores provide compartmentalized functional blocks that can be used within a programmed PLD or other logic device. PLDs also are used frequently as application specific integrated circuit (ASIC) emulators and application specific standard product (ASSP) emulators. As will be appreciated by those skilled in the art, the present invention also may be used in connection with a device such as an ASSP having special or optional features hard-wired into the device (where the control circuitry disclosed herein can be used with a key or authorization code to access or enable one or more such special or optional features). Once a logic device such as a PLD is programmed with one or more of such cores, as well as any other logic as needed, the PLD can function in a larger system designed by the user just as though dedicated logic chips were employed.

One improvement in this field is the development of so-called "megafunctions" by companies such as Altera Corporation. Briefly, megafunctions are pre-designed, pre-tested, parameterized cores (or blocks of IP) which, when used, complement and augment existing design methodologies. When implementing complex system architectures, these megafunctions significantly enhance the design process. By using megafunctions, designers can focus more time and energy on improving and differentiating their system-level product, rather than re-designing frequently used functions.

As mentioned above, megafunctions are pre-designed, pre-verified parameterized implementations of system-level functions which reduce the customer's design task to creating the custom logic surrounding such commonly used system-level functions, dramatically shortening the design cycle by leveraging such existing intellectual property ("IP"), which can include proprietary apparatus, structures, techniques and methods applicable to the design field. Typically, an IP owner provides all of the files necessary to design with the megafunctions. Current practice allows designers to instantiate, compile and simulate a function to verify its operation, size and performance; however, programming files and other output files for implementing the design in hardware can be generated only with an authorization code provided when the megafunction is licensed.

Figure 1:
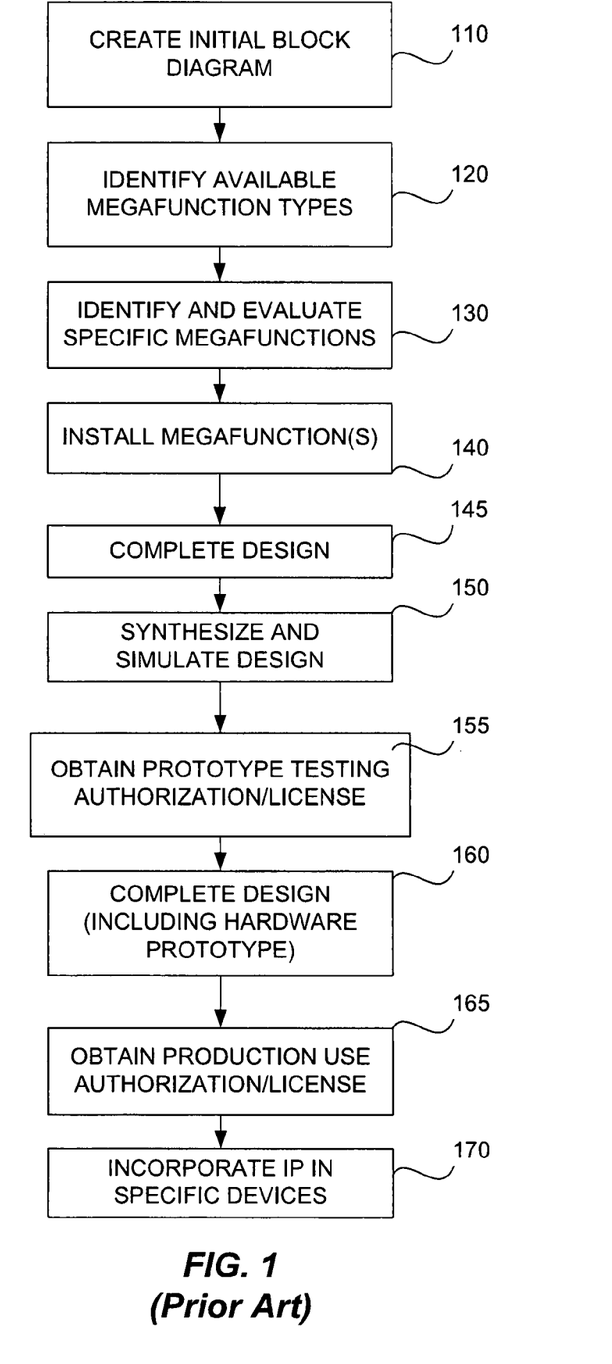
FIG. 1 is a block diagram showing a prior art design cycle for a digital system.

A typical design cycle (using, for example, Altera's OpenCore technology) is shown in FIG. 1. A designer creates an initial block diagram 110 and subsequently identifies any megafunctions available for use in the anticipated system 120. The designer then can identify and evaluate one or more specific megafunctions 130 in terms of functionality and the range of parameterization available. After finding the appropriate megafunction(s), the designer installs the megafunction(s) 140, completes the design 145 and, using software, synthesizes and simulates 150 the functionality and performance and estimates the hardware resources in the PLD required to implement the function within the anticipated circuitry and system.

However, software simulations of complex systems that incorporate IP frequently are limited in a number of respects. For example, many hours of software simulation of a circuit used in a voice over technology might translate into only a few seconds of equivalent circuit activity on a hardware platform. As a further example, a system may have an extremely large number of states, all of which the designer may need to test or otherwise evaluate. However, due to the relatively slow speed of some software simulations, only a limited number of states might be testable by such software simulation. Because a hardware platform may run at much higher speeds than software simulations, a designer may need and/or want to test the design on a hardware platform as well. With regard to PLDs, software simulation for several hours (representing a few seconds of PLD hardware operation) might represent appropriate evaluation time for a design. Yet, to thoroughly validate the system which may include one or more cores in such an application, the system (sometimes including several cores) must run in hardware for several minutes to several hours or more, thus making thorough software simulation testing inadequate and/or impractical. Therefore, complex IP (for example, in video applications or voice over IP) should be evaluated and validated on a hardware platform before being purchased.

In such applications, in order to fully validate and complete the system's design, as called for in step 160, the system frequently operates on a hardware prototype platform for a longer period of time than is practical for software simulation. After software simulation and synthesis, the IP owner authorizes the customer 155 (via a license or other authorization means) to generate programming data, such as a programming object file (a "POF" file) or an SRAM object file (a "SOF" file) of the design containing the IP, and to establish the hardware prototype. A hardware prototype platform is substantially identical to the production version of the hardware a designer intends to create. The hardware prototype can be a PLD or other device, or a system or subsystem of the total design to be created. As will be appreciated by those of ordinary skill in the art, the particulars of a hardware prototype are dependent upon the needs and circumstances of the project being undertaken by a designer and will vary widely. In the context of this disclosure, the term "hardware prototype" will mean any hardware platform suitable for evaluating and/or testing the hardware and available software for the system being designed. This hardware prototype also may be referred to herein as the "evaluation version" of a core, design or programmed device. The term "production hardware" means the desired final configuration of any hardware that the designer intends to achieve. Once this hardware prototype validation is completed, the customer can obtain from the IP owner production use authorization (such as a license) 165, after which the IP used can be incorporated into specific devices 170 and be put into production use.

Many IP owners have had to rely on legal contracts and/or other, unverifiable means to limit and control use of their IP on hardware platforms during prototype evaluation (step 160 of FIG. 1) and during production use (step 170 of FIG. 1). Customers have been able to generate a file that could be used both for prototype evaluation as well as in production. Unauthorized use in production deprives the IP owner of compensation for use of its IP and inhibits the owner's control of its property. Attempts at technical measures to prevent unauthorized use of IP also have been only modestly effective. For example, there have been attempts to send an entire prototype "package" (a PLD with the system installed and with its own power supply) to a customer for limited evaluation. Such a pre-packaged system was intended to allow hardware evaluation, without unauthorized production use. However, the delicate nature of these systems and the need for the IP owner to incur significant costs in this method make it unattractive and ineffective.

One other solution to these problems is available using a technique that is the subject of U.S. patent application Ser. No. 09/823,700, entitled METHOD AND APPARATUS FOR PROVIDING A PROTECTED INTELLECTUAL PROPERTY HARDWARE, filed Mar. 30, 2001, and assigned to Altera Corp., which is incorporated herein by reference in its entirety for all purposes. One or more aspects of the embodiments discussed in the above-cited application are incorporated in Altera's OpenCore Plus feature that is described in Application Note 176 from Altera Corporation of San Jose, Calif. In the system discussed in the above-cited application, various techniques provide a means for potential users of PLDs to evaluate proprietary IP in hardware and thus permit improved development of digital systems and devices by designers while protecting the interests of the owners of the intellectual property incorporated in such systems and devices. More specifically, that system provides to an end customer IP hardware which is suitable for prototype evaluation, but unusable for production purposes.

While these techniques, methods, machine readable media and apparatus have provided an effective means for supplementing software evaluation by permitting limited hardware prototype evaluation, there are several shortcomings that arise in its use. First, two different versions of each testable core must be created—a production version designed to run on hardware in normal circumstances, and a evaluation version designed to be time-limited to allow hardware prototype evaluation without production use. Typically, a license is required from the owner of the IP used in each core and the core will be disabled at a set time limit. This technique requires each IP designer to modify each core to create the evaluation version of the core.

The manual process of adding/inserting the disabling logic is time consuming and may lead to errors in the operation of the core in the hardware prototype mode. Moreover, additional verification is needed to insure that the modifications required to limit evaluation time did not break the intended functionality of the core. This technique also requires that, within the "designed logic" (that is, the overall logic designed and constructed by a user, which can contain "protected logic" such as a core incorporating IP and "user logic" which is logic created by the user), each core and each other instantiation of protected logic being evaluated must have its own clock and/or other disabling logic (also referred to as "control logic") located inside the core. These characteristics can adversely affect the size and performance of the core(s) being evaluated and the hardware environment in general. Any timeout period typically is unalterable, being dictated and fixed by the counter and clock implementations in the modified core containing the control logic. Finally, because different cores may be designed by different designers, or may be designed differently for other reasons, inconsistencies in the evaluation cores' logic and operation can lead to problems. In programs such as the Altera Megafunction Partners Program (AMPP), where third party designers participate in the design and implementation of cores, these drawbacks can present hurdles and/or barriers to such third party participation, thus reducing the amount of IP available for hardware prototyping by users of PLDs and other similar logic devices.

Techniques that permit thorough development and evaluation of digital systems and devices by users, while simplifying the evaluation process, adding flexibility and greater reliability to the process and protecting the proprietary interests of the designers and owners of the intellectual property incorporated in such systems and devices would represent a significant advancement in the art. Moreover, these techniques can be extended to allow an IP owner to limit or prevent unauthorized use of its IP in other settings and contexts (for example, where users employ protected IP in systems and devices shown and used in display, marketing and other non-production contexts).

BRIEF SUMMARY OF THE INVENTION

The present invention permits hardware prototype evaluation and other limited use of IP in a programmed device, while protecting the proprietary interests of the owner(s) of the IP. An end user or designer can evaluate IP cores and/or other protected logic together with user logic in a logic device in a limited fashion with trivial or no modification of a production version of the IP core or other protected logic. The present invention provides users and IP owners with systems, methods, machine readable media and apparatus to perform such evaluation in a protected mode of operation.

These advantages are accomplished by using control logic that is external to the designed logic (for example, the user logic and protected logic) to control a user's use of any protected logic. The designed logic typically includes both user logic and protected logic. The external control logic can control the designed logic by accessing a top level input or output that can be used to disable the designed logic after a preset condition is met. In some cases, the entire device can be disabled.

In some embodiments of the present invention, in determining whether the preset condition has been met, the control logic utilizes a counter of some type that counts down from a reset value to a preset time limit. The counter can be reset to the reset value whenever a valid token or other valid keep alive signal is received by the control logic. If the counter reaches the time limit prior to receiving a valid token or other keep alive signal, then the control logic disables the logic device, designed logic or some other part of the logic device.

The tokens may be single bit tokens, where the mere receipt of a token is sufficient to prevent disabling of the logic device, or multi-bit tokens which can require, for example, processing and/or validation of the token. The tokens can be sent to the control logic from outside the logic device by a tether connecting the logic device to a controller of some sort (for example, a computer). The tether can be a cable or a wireless connection between the controller and control logic. One possible source of tokens is a software daemon running on a controller computer system.

In untethered embodiments of the invention, the control logic can be programmed to be self-regulating and thus control use of the protected logic without the need for a tether. Also, multiple cores may be implemented in a given logic device, in which case the control logic can control the entire protected logic under one set of conditions or using multiple criteria for disabling the appropriate logic controlled under those criteria.

Methods, systems, apparatus and computer program product embodiments of the present invention are also included. Further details and advantages of the invention are provided in the following Detailed Description and the associated Figures.

BRIEF DESCRIPTION OF THE SEVERAL VIEWS OF THE DRAWING

The present invention will be readily understood by the following detailed description in conjunction with the accompanying drawings, wherein like reference numerals designate like structural elements, and in which.

DETAILED DESCRIPTION OF THE INVENTION

The following detailed description of the invention will refer to one or more embodiments of the invention, but is not limited to such embodiments. The detailed description is intended only to be illustrative. Those skilled in the art will readily appreciate that the detailed description given herein with respect to the Figures is provided for explanatory purposes as the invention extends beyond these embodiments. For example, the present invention is described in connection with designing a digital system and controlling hardware and/or software, thus prohibiting unauthorized use of IP in production and other settings. However, the present invention can be used to limit and/or prohibit many types of unauthorized use of an owner's IP. Consequently, the present invention is not limited solely to the prototype evaluation/production situation; it may be employed, for example, in marketing or display situations to limit the run time of devices using protected IP. Moreover, the present invention is described herein in connection with a PLD, which is used solely for illustration. Again, however, the present invention may be incorporated into and used with other hardware and software and with other devices. Other "logic devices" which could use the present invention include (without limitation) ASIC emulators, ASSP emulators and other devices having logic cores and/or other IP which can only be accessed and/or enabled with authorization from the IP owner or other appropriate party. Moreover, other methods and techniques could be used to permit development and use of digital systems and devices by designers while protecting the proprietary interests of the owners of the intellectual property incorporated in such systems and devices.

The present invention allows an IP owner to generate a SOF file (or authorization codes to create such files) that can be used to program devices such as those found in Altera's family of programmable devices suitable for limiting the end customer's use of the owner's IP (for example, allowing only limited hardware prototype evaluation). The IP owner authorizes the customer to generate special SOF files that contain the IP embedded within the user's system design. Each special SOF file prevents programming of the design into a flash or other memory device, thus requiring connection to a host device for programming and, in some embodiments of the present invention, requiring a continuing connection (via tethering) to permit continued evaluation of the programmed design. The end customer cannot use this SOF file in an unlimited or otherwise unauthorized manner (again, for example, in a production setting). Consequently, the proprietary interests of the IP owner are better protected because a party being given only limited authority to use the owner's IP (again, for example, in evaluating a hardware prototype or in connection with limited production or commercial uses) will not be able to engage in the unauthorized use of the IP owner's intellectual property. In the various embodiments disclosed, the owner can limit the conditions under which the licensee can use the IP. This limited use is accomplished with no or only trivial revisions to the IP to accommodate the evaluation environment and conditions.

Generally, embodiments of the present invention employ various processes involving data stored in or transferred through one or more computer systems. Embodiments of the present invention also relate to a hardware device or other apparatus for performing these operations. This apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

In addition, embodiments of the present invention relate to computer readable media or computer program products that include program instructions and/or data (including data structures) for performing various computer-implemented operations. Examples of computer-readable media include, but are not limited to, magnetic media such as hard disks, floppy disks, and magnetic tape; optical media such as CD-ROM disks; magneto-optical media; semiconductor memory devices, and hardware devices that are specially configured to store and perform program instructions, such as read-only memory devices (ROM) and random access memory (RAM). The data and program instructions of this invention may also be embodied on a carrier wave or other transport medium. Examples of program instructions include both machine code, such as produced by a compiler, and files containing higher level code that may be executed by the computer using an interpreter.

Figure 2:
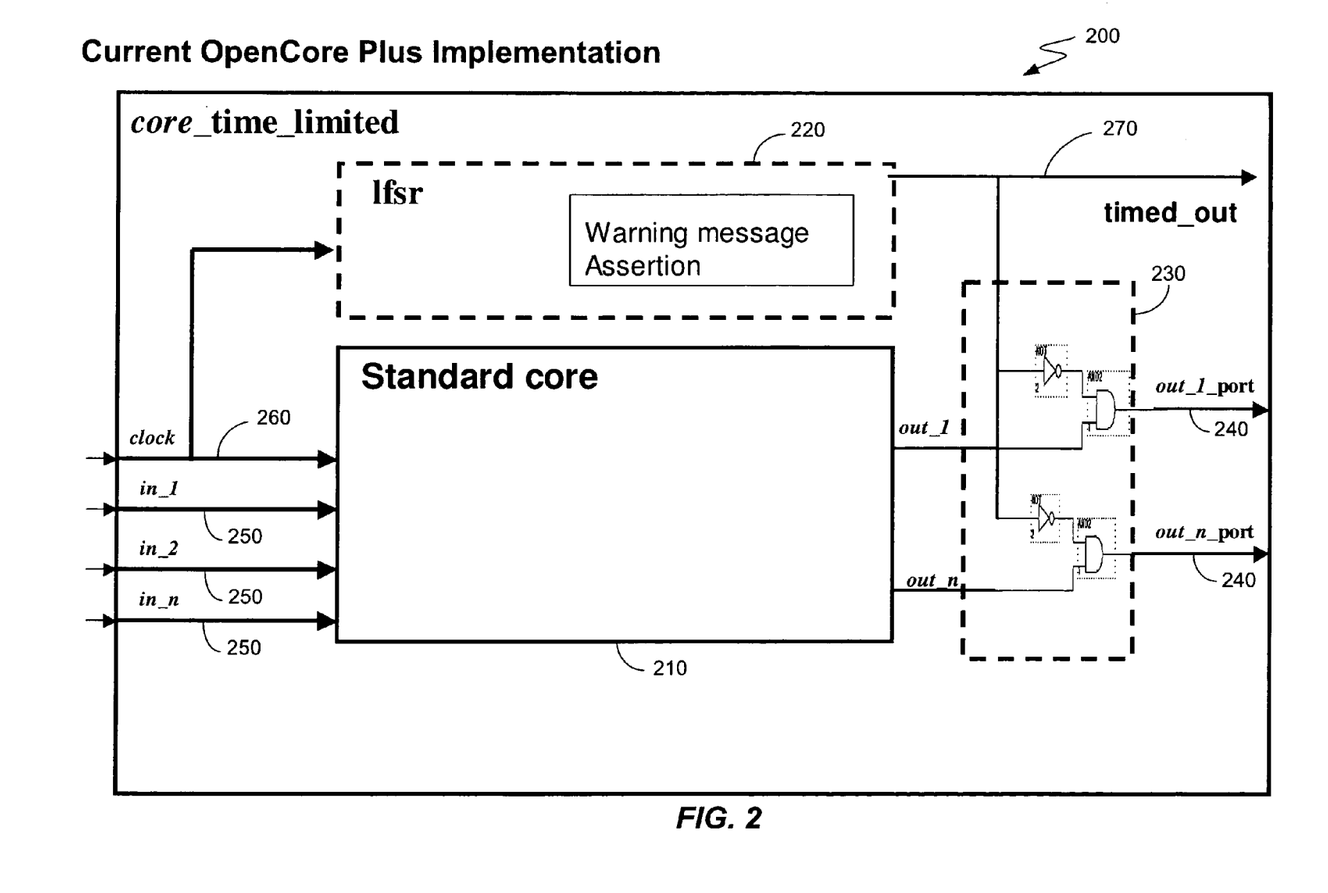
FIG. 2 is a block diagram of a computer system that may be used to implement various aspects of this invention.

FIG. 2 illustrates a typical computer system that, when appropriately configured or designed, can serve as an apparatus of this invention. The computer system 200 includes any number of processors 202 (also referred to as central processing units, or CPUs) that are coupled to storage devices including storage 206 (typically a random access memory, or RAM) and storage 204 (typically a read only memory, or ROM). CPU 202 may be of various types including microcontrollers and microprocessors.

Both of the storage devices may include any suitable computer-readable media such as those described above. A mass storage device 208 is also coupled to CPU 202 and provides additional data storage capacity and may include any of the computer-readable media described above. Mass storage device 208 may be used to store programs, data and the like and is typically a secondary storage medium such as a hard disk.

CPU 202 also is coupled to an interface 210 that connects to one or more input/output devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 202 optionally may be coupled to an external network 212. With such a connection, it is contemplated that the CPU might receive information from the network, or might output information to the network in the course of performing the method steps described herein. As will be appreciated by those skilled in the art, modifications can be made to a system such as computer system 200 to enable it to perform specific functions in particular settings. Moreover, not all of the components/elements described herein are necessarily required for operation and acceptable performance in connection with the present invention.

Figure 3:
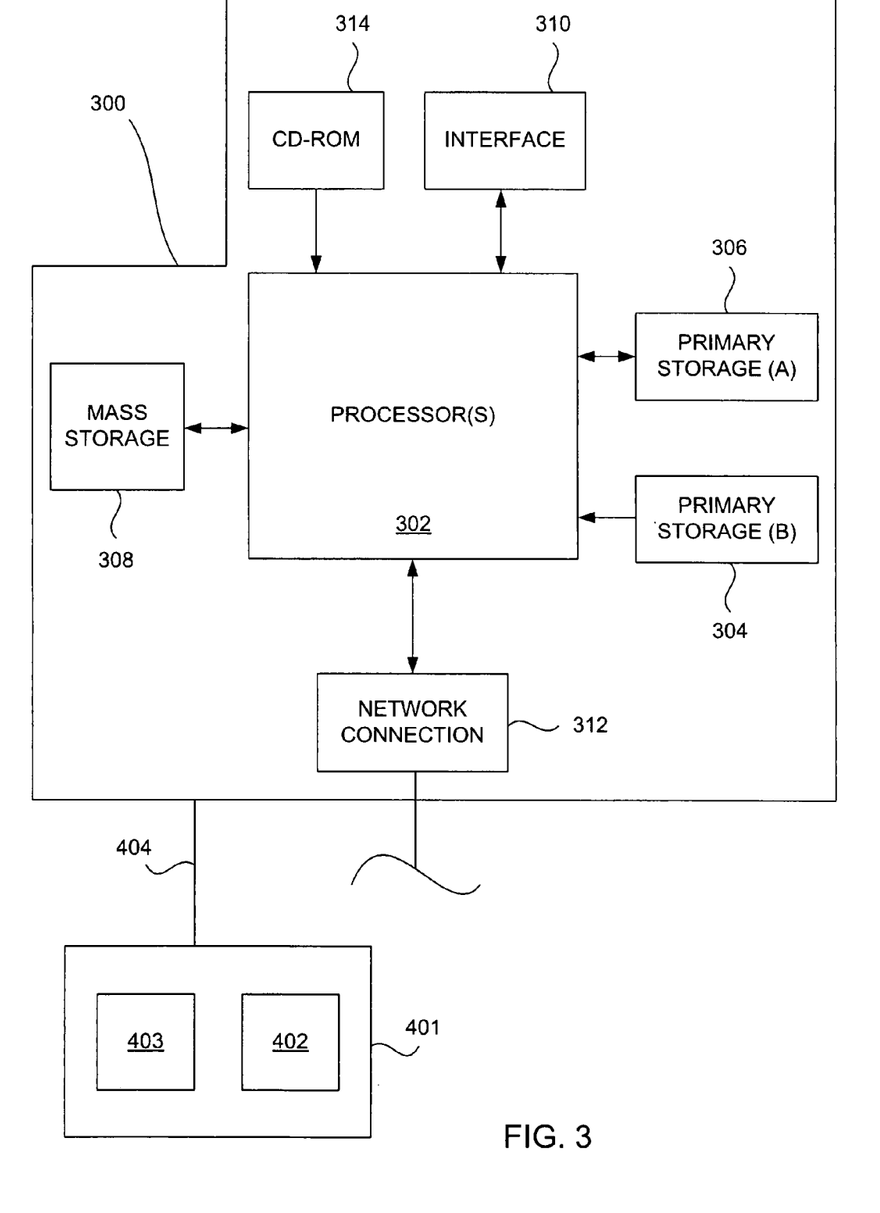
FIG. 3 is a block diagram of one embodiment of the present invention in which a computer system controller is connected by a tether to a user board that includes a logic device.

In one embodiment of the present invention shown in FIG. 3, a controller (such as computer system 200) is used by a customer. The controller uses a control program, such as Altera's Quartus design software. Typically, such software can be supplied by the IP owner or other party on a CD used in the controller's mass storage device 208, on a floppy disk used in a disk drive, by downloading via the controller's connection to network 212 or by any other means and/or method known in the art. Information and programs, including bitstreams, device programming and configuration files that configure a logic device (for example, SOF files) and other files, can be provided via the interface with network 212 for downloading by a customer's controller 200. Alternatively, such information, programs and files can be provided to a customer on a storage device.

Once in a customer's possession, a memory device such as storage 206 or mass storage 208 buffers or stores a file or other data from the IP owner or other third party (for example, a licensee or distributor) to be used in evaluating the IP and the user's design on a hardware platform. The files and other data obtained by the customer from the IP owner can then be used in connection with the hardware device, such as a programmable logic device. As seen in one exemplary configuration shown in FIG. 3, the customer's controller 200 is connected by a tether 404 to a customer board 401 that includes a logic device 402 and, in this case, a memory device 403. The tether 404 may be a wireline connection, such as a computer download cable, or a wireless connection and/or interface permitting the wireless transmission of data and/or instructions between the controller 200 and the board 401. One feature of the present invention is that a customer using protected IP cannot download such IP to a memory device 403 which would allow uncontrolled use of the IP in operation of the device 402. The details of how IP owners and customers use such inventions are discussed in more detail below.

As mentioned above, the present invention can be used in a variety of ways to limit a licensee's use of the owner's IP. For purposes of this discussion, several embodiments of the present invention will be described in the context of limiting a licensee's use of an owner's IP during the design of a digital system. While this embodiment provides a good example of how the present invention can be used, the example is in no way limiting with respect to the scope of the invention.

Unlike earlier evaluation systems that required multiple versions of a given core design, with the present invention, only one version of a core or other design is needed for both hardware evaluation and production uses. In some cases, trivial modification of the core design may be required. A license may optionally be required for advanced hardware evaluation using the present invention.

In one embodiment of the present invention, hardware evaluation using a tethered approach is controlled by a controller (for example, a computer) running a control program (for example, a software daemon or other program that includes a software daemon) that periodically passes keep alive signals (for example, single bit or multi-bit tokens) over a tether (for example, a download cable) via an input in a programmed device (for example, a JTAG port, a dedicated I/O or general purpose I/O) to a signal generator in the programmed device. An evaluation time limit can be set in the programmed device to limit the maximum operational time in the absence of a valid keep alive signal. The evaluation time can be based on one or more parameters in the programming file's encrypted header (which contains permissions associated with the IP in the SOF file used to program the device). That programming file also contains encrypted source code for a programmed core (that is, data associated with the IP in the SOF file used to program the device). The evaluation time can be established easily with authority from the IP owner, and optionally by elapsed or calendar time specified in a license file.

If the tether is disconnected from the programmed device (thus preventing tokens or other keep alive signals from being received in a timely manner), or if invalid keep alive signals are received (as determined in some embodiments by a validation circuit in the signal generator), the hardware evaluation expires when a timeout linear feedback shift register ("LFSR") in the signal generator reaches its terminal state. The length of the LFSR sequence can be calculated by an evaluation/control program (for example, Altera's Quartus II software) based on information in the core's encrypted header and the maximum frequency of a ring oscillator inserted by the control program. An IP owner may optionally choose to have the core never time out as long as the tether is active.

Hardware evaluation time using an untethered approach may be based on information in a programmed core's encrypted header which the control program can use to determine the length of the timeout LFSR sequence when clocked by a ring oscillator whose maximum frequency is calculated by the control program based upon the logic device characteristics. The hardware evaluation ends when a programmed time limit is reached (preferably by disabling the logic device), for example when the LFSR reaches its terminal count. The LFSR is reset on power up and whenever it receives a reset command or signal. So long as the LFSR continues to be reset periodically (at least prior to a programmed timeout limit), no disabling signal is sent to disable the programmed/controlled cores and/or the entire programmed device.

Figure 4A:
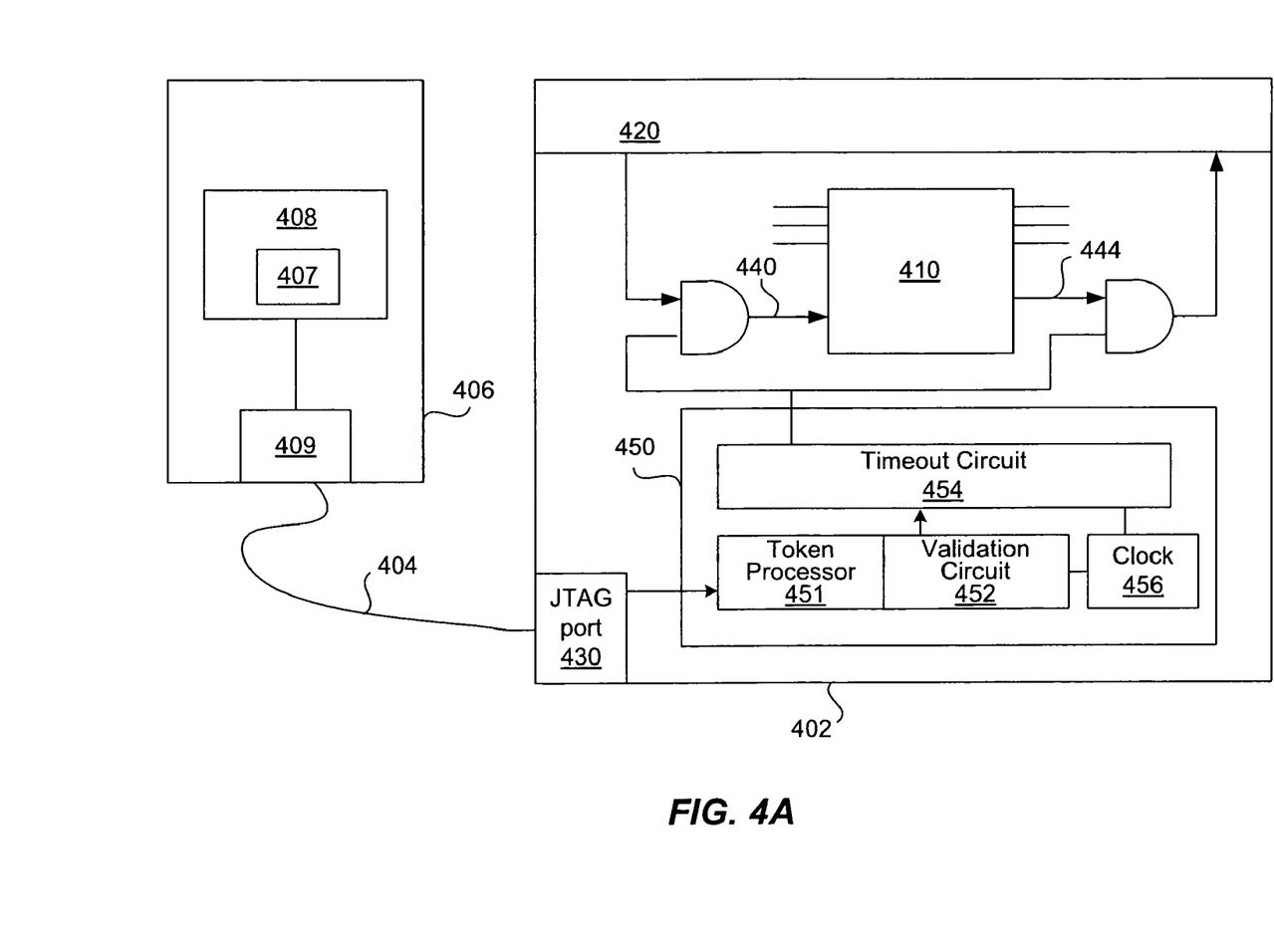
FIG. 4A is a block diagram of a system implementing one embodiment of the present invention using a tethered approach.

One system embodying the present invention is shown in FIG. 4A. The system shown in FIG. 4A has a logic device 402 (for example, a PLD) that has been programmed. Programming of devices such as PLDs and other types of devices usable with the present invention is well known in the art.

The programmed device 402 includes programmed logic which can be segregated into "designed logic" (which is created and/or assembled by the user) and "control logic" (which is generated and inserted by a controller or some other party other than the user). As noted above, in other embodiments of the present invention, some or all of the logic may be hard-wired into the logic device with which the present invention is used. The designed logic further includes "protected logic" which is logic provided by a party other than the user (for example, in FIG. 4A, one or more programmed cores 410 that contain protected IP) and "user logic" which is logic defined at least in part by the user (for example, logic cores created by the user and user designed logic and/or other logic 420 used to connect and integrate protected logic and other, unprotected cores into a larger design). In FIG. 4A, the protected logic in the form of one or more programmed controlled cores 410 is connected to user logic 420 to create the designed logic. In the embodiment of the present invention shown in FIG. 4A, the control logic includes a signal generator 450 connected between a device input 430 and the programmed logic (for example, each controlled core 410) in the device 402. Other configurations of the programmed logic, designed logic, protected logic, user logic and control logic are possible and will be apparent to those skilled in the art. Generally, the control logic is used in the present invention to disable all or part of the designed logic or the entire logic device if use of the designed logic extends beyond certain limits placed on its use in an evaluation context (for example, a time limit). This limited use protects against a user's unauthorized use of the protected logic.

In the preferred embodiment, the input 430 is a JTAG port or similar structure, such as a configuration I/O or a general purpose I/O. The signal generator 450 in this configuration verifies authorization for continued operation of the designed logic (the user logic and/or any controlled core(s) 410). The signal generator 450 of the embodiment shown in FIG. 4A is designed to count from an initial count value until the signal generator 450 either:

(i) reaches a programmed time limit, such as a terminal count, at which point the signal generator disables some or all of the programmed logic (for example, the controlled core(s) 410 and/or the entire device 402), or (ii) is reset to the initial count value (which restarts the counting and thus permits continued operation of the core(s) 410 and device 402).

In some embodiments of the present invention, each controlled core 410 has a disabling signal access, which is an access point to the controlled core 410 to which a disabling signal can be sent by the signal generator 450, and which is either a top level input 440 or a top level output 444, as seen in the embodiment shown in FIG. 4A. Use of such top level, externally accessible signals eliminates or greatly reduces the modification needed for a core to be usable within the present invention. Any appropriate signal(s) and/or access point(s) can be used in this regard, as will be appreciated by those skilled in the art. When the signal generator 450 reaches its terminal count or other time limit or other preset condition, it generates and sends a disabling signal to the signal access(es) of each controlled core 410. In some cases, it may be desirable to disable the entire device 402, rather than one or more of the cores 410 individually. In some cases, where multiple cores or versions of protected IP are being tested or used in some limited fashion, multiple signal generators and/or other timeout techniques can be employed to disable independent segments of logic within a single device using, for example, multiple disabling signals generated after different terminal counts. Such adaptation of one or more embodiments to accomplish this is within the scope of the present invention.

Generally, in some embodiments of the present invention, the signal generator 450 receives keep alive signals, also referred to herein as tokens, from a keep alive signal generator or token generator. In some embodiments, the token generator is a source external to the logic device. The token generator outputs tokens in a prescribed manner and the tokens are used by the logic device to prevent disabling of logic or the entire device. For example, the control logic of the logic device can contain a counter that starts counting when the programmed logic device is initially operated, and counts from an initial count value to a time limit (such as a terminal count value) unless the counter is reset prior to reaching the time limit. The counter will naturally timeout and disable the logic device, the programmed logic and/or the designed logic in the absence of an authorizing token.

In the embodiment shown in FIG. 4A, the input 430 of device 402 is connected by tether 404 to an output 409 of a controller 406. The controller 406 can be a suitable host processor (such as a PC or workstation, for example, one resembling, in pertinent regards, the computer system 200 discussed above). In the embodiment of the present invention illustrated in FIG. 4A, a control program 408 is the token generator and resides on the controller 406. The program 408 can send signals to the logic device 402 (for example, initially sending a configuration bitstream to program the device 402 and thereafter sending keep alive signals to permit continued evaluation of a programmed device using protected IP, though the keep alive signals may be generated and sent by a separate device or source in other embodiments of the present invention) via the output 409, the tether 404 and the device input 430. As will be appreciated by those skilled in the art, the keep alive signals can be generated by any suitable device, computer program or the like and may be sent to the programmed logic device in any suitable manner. For example, the keep alive signal generator does not have to be a control program on the controller and instead could be a separate token generator 409A that sends keep alive signals over a separate wireline or wireless tether 404A, shown as an alternative in FIG. 4A.

In the embodiment of FIG. 4A, to permit authorized evaluation or other use of a programmed logic device 402, the controller 406 periodically sends keep alive signals to the signal generator 450 via the tether 404. One way to do this is by running a software daemon 407 in the control program 408 on the controller 406 that periodically passes tokens to the device 402 over the tether 404. As will be appreciated by those skilled in the art, the software daemon running on the host processor does not necessarily have to be part of or be contained within the control program 408 nor does the daemon have to even be located within the controller 406. Each valid keep alive signal resets the signal generator count to its initial count value to prevent the signal generator's generating and sending a disabling signal (for example, to each core 410 connected to the signal generator 450). The behavior of the control program 408 can be modified easily with authority from the IP owner or other authorized party to adjust the timeout period and/or other conditions controlling evaluation or other use of the hardware. The timeout period (that is, the programmed time limit) can be established easily with authority from the IP owner or other authorized party, and, for example, can be measured by elapsed time (for example, a terminal count) or calendar time.

The control logic is coupled to the input 430 of logic device 402. In the embodiment of the present invention shown in FIG. 4A, the signal generator 450 includes a token processor 451, a validation circuit 452, a timeout circuit 454 and an internal clock 456 used by the validation circuit 452 and timeout circuit 454, as described below. All of these signal generator components are programmed into the device 402 in the embodiment of the present invention shown in the Figures. However, in the case of a device with hard-wired options and/or features, the signal generator and other control logic also could be hard-wired into the logic device 402.

In one embodiment of the present invention, the keep alive signals (that is, the authorizing tokens) sent to the device 402 by controller 406 are multi-bit tokens which require validation prior to generation of a reset signal to reset the timeout circuit 454. These multi-bit tokens can be clocked into the device 402 using the clock signal of the input 430 and then sent on to the token processor 451. After appropriate processing (which, as will be appreciated by one skilled in the art, may be optional or completely omitted in some embodiments), the tokens are sent to the validation circuit 452 for validation. If the tokens are valid, the validation circuit 452 is configured to reset the timeout circuit 454, thereby forestalling timeout of the controlled core(s) 410 and/or programmed device 402. Clock signals used to run the validation circuit 452 and timeout circuit 454 can be supplied by clock 456.

When initially powered up and after each reset signal from the validation circuit 452, the timeout circuit 454 begins counting toward a time limit such as a terminal count. Each reset signal received from the validation circuit 452 resets the timeout circuit 454 to begin its count anew. As will be apparent to those skilled in the art, disconnection of the tether 404 in this embodiment will mean that valid keep alive signals will fail to reach the validation circuit 452, thus preventing resetting of the timeout circuit 454. Likewise, invalid keep alive signals sent to the input 430 of the device 402 will result in the disabling of the device 402 and/or core(s) 410 when the timeout circuit 454 reaches its terminal count. Alternatively, receipt of an invalid keep alive signal may, by itself, trigger disabling of the controlled core(s) 410 and/or device 402.

In some embodiments, where security is less of a concern (or for other reasons), single bit tokens can be used as keep alive signals or authorizing tokens. In those cases, the validation circuit 452 may be omitted, so that tokens received by input 430 automatically reset the timeout circuit 454 without validation being performed. In such cases, a token processor 451 may or may not be necessary, as will be appreciated by those skilled in the art.

Figure 4B:
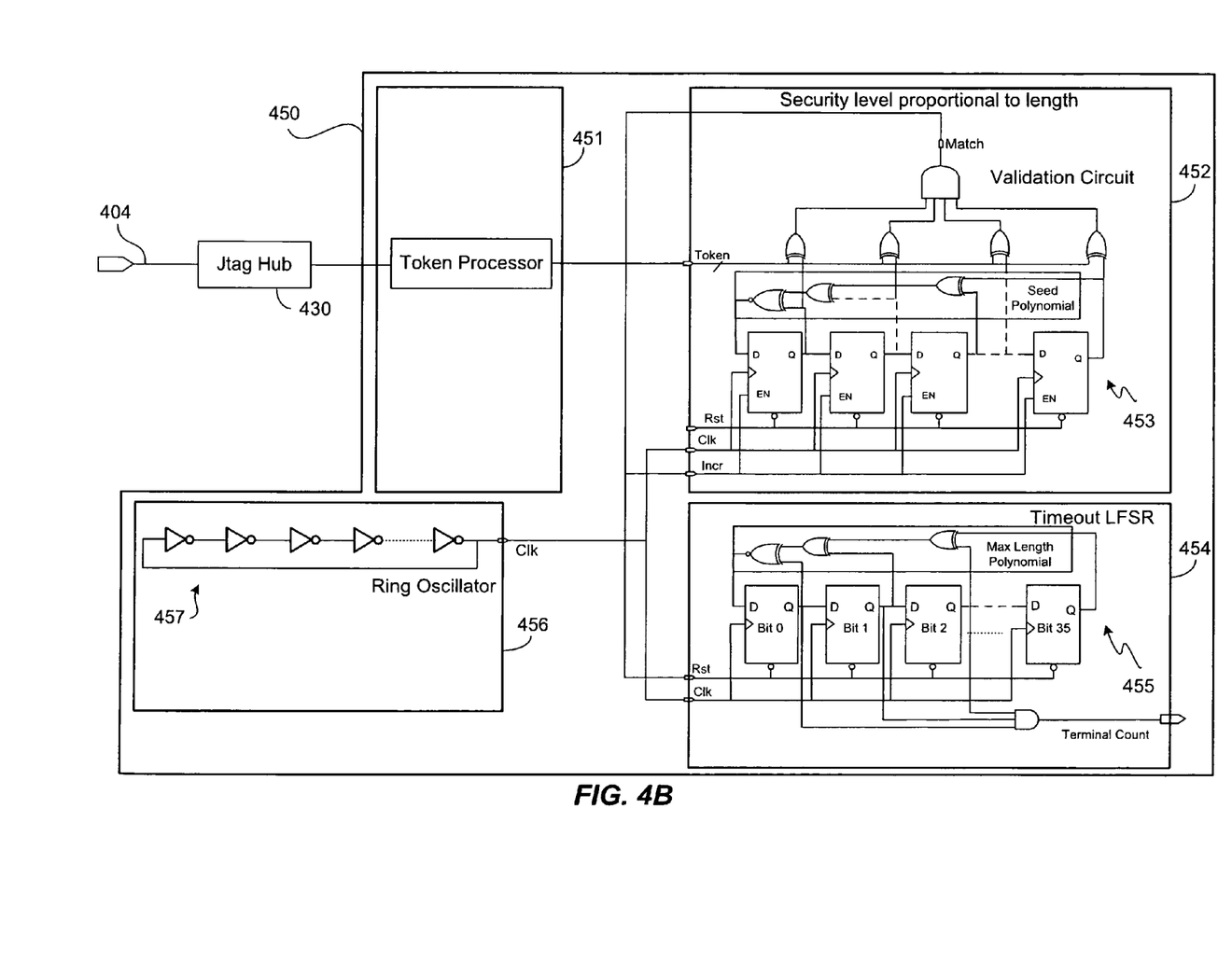
FIG. 4B is a detailed block diagram of a signal generator usable in a system implementing one embodiment of the present invention.

A more detailed view of one embodiment of the signal generator 450 of FIG. 4A is shown in FIG. 4B. In this embodiment, the keep alive signals are multi-bit tokens and the control program 408 being run on the controller 406 can install this signal generator 450 as part of the programmed design of device 402. Since only one such signal generator is needed for the entire device 402 (thus eliminating the need to program an individual counter and any accompanying required logic into each core as separate design features), the present invention makes more efficient use of device space and resources and has less of an impact on the efficiency and operability of programmed devices being evaluated. Alternatively, as noted above, multiple control logic means could be provided for a design in which multiple cores have different timeout periods or other conditions under which disabling would take place.

In the preferred embodiment, both the validation circuit 452 and the timeout circuit 454 run off of the internal clock 456, which is a ring oscillator 457 (which, if desired, can be double buffered) whose length is specific to the fastest speed grade available in the device in which it is to operate. Preferably, the target speed of the ring oscillator is about 30 MHz; however, it is acceptable (and in some cases desirable) for the oscillator speed to vary considerably, perhaps up to 3 times faster or 5 times slower than nominal. The actual ring oscillator length, speed and expected variation for each logic device type can be determined by one of ordinary skill in the art.

The validation daemon 407 on the controller 406 (or a token generator 409A located elsewhere) delivers the correct multi-bit tokens via the tether 404 to the input 430. Tokens received at the JTAG port 430 are processed by processor 451 and passed to the validation circuit 452 which, in the configuration shown in FIG. 4B, includes a rolling code token-passing validation circuit 453 having an LFSR with a programmable polynomial seed. A "rolling code" circuit uses tokens in which the token value can change from token to token. The seed is determined in any suitable manner (for example, by the controller's real time clock at the time the logic device is configured) and is passed to a validation daemon 407 residing on the controller 406. If correct tokens are not being received correctly or on time, the daemon can display a warning that disabling of one or more cores is imminent. When the validation circuit 452 receives and validates a token, it generates a reset signal that is sent to the timeout circuit 454.

In the example illustrated in FIG. 4B, the timeout circuit 454 is a maximal length timeout LFSR 455 whose run time is the minimum run time specified by any controlled core(s) in a device when clocked by the fastest ring oscillator speed. When the timer expires, it can signal all of the cores in the device to effect their timeout behavior and can assert an external "timed-out" pin. As noted above, the timeout LFSR will be reset to the initial state of its countdown sequence as each reset signal is received. If the timeout LFSR 455 expires before the next correct multi-bit token is received, the device 402 will timeout, and will require additional action (for example, re-programming or re-initialization of the control circuit in the programmed device) in order to resume functioning. Obviously, tokens (whether multi-bit tokens or single bit tokens) must be received more frequently than the minimum duration of the time out LFSR 455 (taking any timing tolerances/variations into account).

Finally, the control program 408 can modify any controlled core's design in a manner consistent with the timeout behavior described in a programming file's encrypted header (defined above), an encrypted RTL source (source code designed to be unreadable and unusable without a corresponding decryption program) and/or any other appropriate instruction(s). Preferably there should be no means for a user to modify any logic associated with the control program or the contents of any encrypted IP using any tool (for example, a chip editor).

The behavior of a core when it times out during evaluation can be determined by the core designer. As noted above, the IP designer can specify a core-specific signal or set of signals and the values that they should be set to when the evaluation has expired, and provide a description of how the core will behave when time has expired. This description can then be displayed by the control program during the compilation process. The IP designer may also specify the minimum runtime for hardware evaluation and whether tethering is supported.

The specific information concerning a given core may be inserted into a core's programming file (for example, in the file's encrypted header). The information can be passed to encryption programs via a command line or via a separate file. In the event there are multiple controlled cores in a given programmed device, the timeout circuit can implement either a minimum specified evaluation time, for example setting the evaluation time to the minimum runtime of the cores controlled by the programmed device, or multiple evaluation times for various logic cores and/or other components of the logic device. For cores delivered as encrypted register transfer level ("RTL") source code, the core disabling signal(s) can be embedded in the encrypted RTL as metacomments, in the encrypted header or elsewhere as appropriate. Any of these disabling signal(s) preferably are primary I/O of the core. Where a core utilizes heavily parameterized IP, embedded metacomments may be the best option. The control program can keep track of this information during the synthesis process. For cores delivered as pre-synthesized netlists, the disabling signal(s) can be embedded in the encrypted header since the signals and netlists are static. For core generators, where RTL is emitted as the result of running a C, Perl or other program, the disabling signal(s) can either be specified as metacomments in the generated RTL or encrypted header as appropriate.

The embodiments of the present invention illustrated in FIG. 4A and FIG. 4B show the programmed device 402 tethered to the controller 406. Wireline or wireless tethering emphasizes the point that the device 402 is to be used for limited purposes only, since it will cease functioning if the tether 404 is disconnected. For cores that support tethered evaluation, as shown in FIG. 4A and FIG. 4B and noted above, the device 402 preferably is kept alive by single bit or multi-bit tokens served by the software daemon 407 on the controller 408 to the input 430 of the device 402 via the tether 404. The tokens are validated by a validation circuit, if necessary, and thereafter reset the timeout LFSR to prevent it from expiring. Thus, the evaluation time can be indefinite or optionally specified in a license file as an expiration date, elapsed time or both. A warning message can be displayed at startup to advise the user that the programmed device 402 will timeout when the timeout LFSR expires based on evaluation time in the license file, or if the device becomes untethered or some other condition is met. A second series of warnings can be displayed when timeout is imminent. These warnings could be provided at other times, such as upon compilation or immediately after programming as a reminder.

Figure 5:
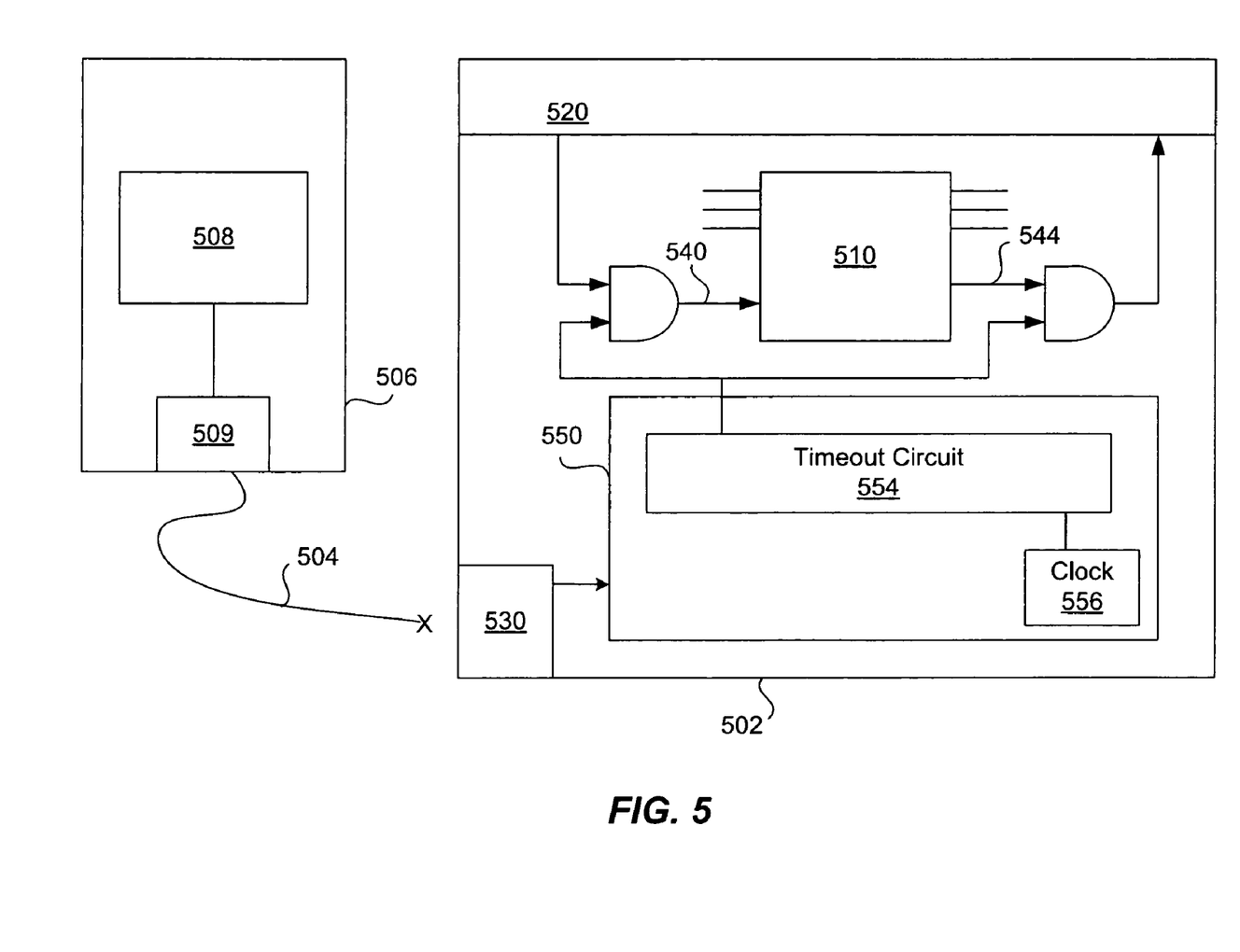
FIG. 5 is a block diagram of a system implementing one embodiment of the present invention using an untethered approach.

In an untethered configuration, keep alive signals such as tokens are not used; the programmed device instead is controlled by internal means, such as on a time basis alone, which can be set and adjusted by the IP owner as desired. For untethered evaluations, as shown in FIG. 5 (where like reference numerals refer to like components described in connection with FIG. 4A and FIG. 4B), the programmed device 502 (again including one or more controlled cores 510 connected to user logic 520 in the device 502) can be set to expire when a timeout circuit 554 (again including, for example, a timeout LFSR) reaches its time limit, such as a terminal count. Disabling signal access can again include either a top level input 540, a top level output 544, both of these or any other appropriate access to the operation of the core(s) 510 and/or the device 502. As noted above, the control program 508 that configures the programmed device 502 can calculate the LFSR length from the minimum of the runtimes specified in the encrypted headers of the file(s) used to program core(s) 510 in a design and the maximum expected speed of the programmed internal clock 556 (including, for example, a ring oscillator). Again, a party evaluating protected IP can have one or more of these values modified by an IP owner or other authorized party as needed or requested. In FIG. 5, the device 502 is shown disconnected from the tether 504 that can be used to program the device 502. Since no keep alive signals are passed from the control program 508 on the controller 506 to the device 502 during evaluation, the signal generator 550 does not include a token processor or validation circuit for these uses.

When a design contains a core authorized and enabled for evaluation using the present invention, the control program 408/508 can automatically modify the logic of a controlled core 410/510 during compilation in accordance with the information in the encrypted header (and/or RTL source code or other source, if applicable). Note that the control program 408/508 does not need to know anything more about the IP or the design of core(s) 410/510. For example, if a signal "A" is specified in a header or RTL source as a signal which, when set and held at "1", will disable the core in a prescribed manner, the control software 408/508 can, for example, disconnect the driver of "A" from its source and "OR" it with an active high "timed out" disabling signal coming from the signal generator 450/550 of the programmed device 402/502. In the tethered mode, the control program 408 can make the timed out signal visible to the user (for example, on the controller 406) as an indication that the evaluation time has expired. A visible or other warning signal can be displayed that disabling of the programmed device 402 is imminent (for example, on the daemon 407 of the controller 406). If none of the cores in a design are authorized and enabled for the present invention, the control program 408 does not have to modify the programmed contents of device 402 in any way. Thus, normal operation will not be impeded, and size and performance reaches will not be impacted. To increase flexibility for the user, the authorization daemon software can run on a controller such as a PC or workstation that either does or does not have the control program installed.

Figure 6:
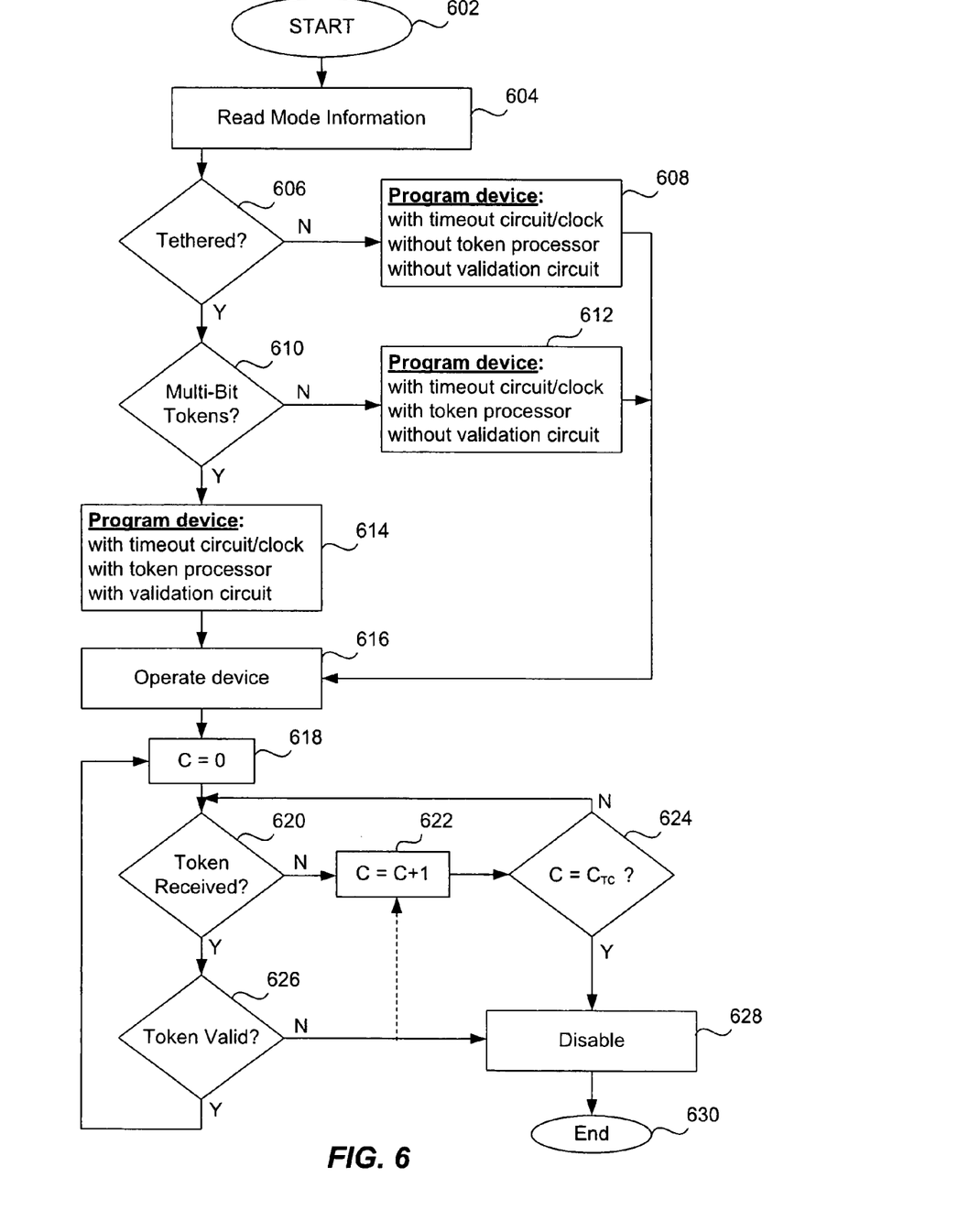
FIG. 6 is a process flow diagram illustrating a method for controlling protected logic in accordance with an embodiment of this invention.

As a further example, FIG. 6 is a flow diagram illustrating one embodiment of the present invention. The flow diagram of FIG. 6 does not require that the system checks for certain actions by event loops or polling. Thus, any process(es) presented herein should not be read to imply that the system necessarily checks for events in the manner and order listed. While this example provides those skilled in the art with an understanding of one or more methodologies of the present invention and an understanding of its use in other contexts, the example presented in FIG. 6 is not to be interpreted as being limited in any way.

The process of FIG. 6 starts 602 and mode information concerning the type of limited use environment (for example, timeout periods, etc.) for the device is read at 604. At 606 the system evaluates whether wireline or wireless tethering is going to be required. If not, the device can be programmed at 608 with a clock and timeout circuit. No token processor or validation circuit is needed since the logic device will not be receiving tokens or other keep alive signals. If some type of tethering is going to be required, then at 610 the system evaluates whether multi-bit tokens are going to be used. If not, then the device can be programmed at 612 with a clock, a timeout circuit and a token processor that is configured to process single bit tokens. If a tethered, multi-bit token configuration is being used, then the device can be programmed at 614 with a clock, timeout circuit, token processor and validation circuit (possibly using the configuration shown in FIG. 4A).

Once the mode of protection is determined and the device is programmed, the device begins operation at 616. In the case of a logic device having control logic and other logic hard-wired into the device little or no programming may be required and the device may simply start operating. A counter (for example, an LFSR in the timeout circuit using count value C) is reset 618 upon initial operation of the device (for example, upon powering up of the programmed device, initial programming of the device or using some type of re-initialization after a prior timeout). The system checks for receipt of a token at 620, which can be eliminated in an untethered system or is effectively ignored in such a system since the answer is always "No" when the programmed device is disconnected from the controller. If no token is received, then the counter value C is incremented at 622 (for example, in an LFSR in the timeout circuit run off of the clock) and then checked at 624 to see whether the terminal count value $C_{TC}$ has been reached. If not, then the system returns to checking for receipt of a token at 620.

If a token is received at 620, then (at least in the case of multi-bit tokens) the validity of the token is checked at 626. In some cases, for example where single bit tokens are used and validation is not used or necessary, step 626 may be omitted. If the token is not valid, then the controlled core(s) and/or device can be disabled at 628, thus ending operation of the logic device. Alternatively, the receipt of an invalid token may merely cause the counter to continue its countdown at 622. Where the token received is determined to be valid, then the counter value C is reset at 618. As long as valid tokens are received before the terminal count $C_{TC}$ is reached, the system will continue to reset itself, thus allowing continuing use of the programmed device. However, once that terminal count $C_{TC}$ is reached at 624, the controlled core(s) and/or device is disabled at 628 and the prototype evaluation or other limited use ends at 630.

The preliminary steps involving configuration of the device and programming of the signal generator (that is, the implementation of a clock, timeout circuit, token processor and validation circuit) may be accomplished in a number of ways, as will be appreciated by those skilled in the art. Encrypted headers of controlled cores can be used in connection with the control program to configure the programmed device to perform according to one or more desired modes of operation (for example, tethered vs. untethered, multi-bit vs. single bit tokens, etc.). Where certain steps or functions identified in FIG. 6 are unnecessary and/or undesirable, such steps and functions can be eliminated. As noted above, where an untethered approach is used, token receipt and validation (for example, steps 620 and 626) may be eliminated or bypassed. Similarly, where single bit tokens not requiring validation are used, validation steps and implementation of a validation circuit are unnecessary. Other modifications and variations of the methods disclosed in connection with FIG. 6 and this disclosure will be apparent to those skilled in the art and are deemed to fall within the scope of the present invention.

As will be appreciated by those skilled in the art, logic devices other than PLDs, such as ASSP devices, can use cores and protected logic to implement special or optional features. These features are hard-wired into the device, as is any needed control logic circuitry. Authorization codes and keys can be provided to users to permit use of the special and optional features for evaluation and/or production uses.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

We claim:

1. A logic device for testing a circuit design, the logic device comprising:
   an input configured to receive a keep alive signal;
   programmed logic comprising:
      user logic including untested logic programmed by an end user of the logic device;
      protected logic including pre-tested, encrypted logic protected from access by the end user; and
      control logic including a signal generator external to the protected logic, wherein the signal generator is configured to detect the absence of the keep alive signal and disable use of the protected logic.

2. The logic device of claim 1, wherein the input is configured to receive the keep alive signal via a wireless link or a cable.

3. The logic device of claim 1, wherein the protected logic is programmed at least in part by a party other than the end user.

4. The logic device of claim 1, wherein the logic device further comprises a timer configured to count from an initial value to a time limit.

5. The logic device of claim 4, wherein the timer is configured to reset to the initial value after the input receives a keep alive signal.

6. The logic device of claim 4, wherein the signal generator is configured to disable use of the protected logic after the timer reaches the time limit.

7. The logic device of claim 1, wherein the programmed logic includes a disabling signal access that is a top level input of the programmed logic or a top level output of the programmed logic.

8. The logic device of claim 1, wherein the programmed logic comprises validation logic configured to validate keep alive signals.

9. The logic device of claim 8, wherein the validation logic includes a rolling code validation circuit.

10. The logic device of claim 1, wherein the signal generator is configured to disable some of the use of the protected logic.

11. The logic device of claim 1, wherein the signal generator is configured to disable the logic device.

12. The logic device of claim 1, wherein the protected logic includes pre-designed, parameterized blocks of IP.

13. The logic device of claim 1, wherein the logic device is a programmable logic device (PLD).

14. The method of claim 1, wherein the logic device is an ASIC emulator or an ASSP emulator.

15. The logic device of claim 1, wherein the protected logic is programmed by a manufacturer of the logic device.

16. An apparatus for controlling hardware and software, the apparatus comprising:

means for providing user logic including untested logic programmed by an end user of the logic device;

means for providing protected logic including pre-tested, encrypted logic protected from access by the end user;

means for providing control logic including a signal generator external to the protected logic;

means for receiving a keep alive signal;

means for detecting the absence of the keep alive signal; and means for disabling use of the protected logic.

17. A method of controlling hardware and software, the method comprising:

providing a logic device having programmed logic, the programmed logic comprising:

protected logic including pre-tested encrypted logic protected from access by an end user; and control logic including a signal generator external to the protected logic;

programming the logic device such that the programmed logic includes untested user logic;

receiving a keep alive signal;

detecting the absence of the keep alive signal; and disabling use of the protected logic.

18. The method of claim 17, wherein the method comprises validating the keep alive signal.

19. The method of claim 17, wherein the method comprises determining, based on the absence of the keep alive signal, whether to disable use of the protected logic.

20. The method of claim 17, wherein the logic device is a programmable logic device (PLD).

21. The method of claim 17, wherein the logic device is an ASIC emulator or an ASSP emulator.

\* \* \* \* \*